United States Patent
Denifl et al.

(10) Patent No.: US 7,271,119 B2
(45) Date of Patent: *Sep. 18, 2007

(54) PROCESS FOR PREPARING AN OLEFIN POLYMERIZATION CATALYST COMPONENT

(75) Inventors: Peter Denifl, Gries am Brenner (AT); Timo Leinonen, Tolkkinen (FI)

(73) Assignee: Borealis Technology Oy, Porvoo (FI)

( * ) Notice: Subject to any disclaimer, the term of this patent is extended or adjusted under 35 U.S.C. 154(b) by 251 days.

This patent is subject to a terminal disclaimer.

(21) Appl. No.: 10/481,312

(22) PCT Filed: Jun. 18, 2002

(86) PCT No.: PCT/EP02/06713

§ 371 (c)(1),
(2), (4) Date: Jul. 6, 2004

(87) PCT Pub. No.: WO03/000754

PCT Pub. Date: Jan. 3, 2003

(65) Prior Publication Data

US 2004/0235644 A1    Nov. 25, 2004

(30) Foreign Application Priority Data

Jun. 20, 2001 (EP) .................................. 01115000

(51) Int. Cl.
- B01J 31/00    (2006.01)
- B01J 37/00    (2006.01)
- C08F 4/02     (2006.01)
- C08F 4/60     (2006.01)

(52) U.S. Cl. .................. 502/109; 502/104; 502/105; 502/107; 502/127; 502/132; 502/133; 502/134

(58) Field of Classification Search ............... 502/104, 502/105, 107, 109, 127, 132–134
See application file for complete search history.

(56) References Cited

U.S. PATENT DOCUMENTS

| | | | |
|---|---|---|---|
| 4,298,718 A | 11/1981 | Mayr et al. | |
| 4,315,874 A * | 2/1982 | Ushida et al. | 502/134 |
| 4,399,055 A | 8/1983 | Matsuura et al. | |
| 4,481,342 A | 11/1984 | Invernizzi et al. | |
| 4,517,307 A | 5/1985 | Cuffiani et al. | |
| 5,188,999 A | 2/1993 | Duranel et al. | |
| 5,212,133 A | 5/1993 | Duranel et al. | |
| 5,382,557 A | 1/1995 | Masi et al. | |
| 6,294,682 B1 | 9/2001 | Rauleder et al. | |

FOREIGN PATENT DOCUMENTS

| | | |
|---|---|---|
| CN | 1068576 A | 2/1993 |
| EP | 0083074 A | 7/1983 |
| EP | 0255790 A | 2/1988 |
| EP | 0 083 073 B1 | 10/1989 |
| EP | 0 281 524 B1 | 4/1990 |
| EP | 0 258 089 B1 | 10/1990 |
| EP | 0536840 A | 4/1993 |
| EP | 0 688 794 B1 | 6/1995 |
| EP | 0 522 650 B1 | 9/1995 |
| EP | 0 533 806 B1 | 5/1998 |
| EP | 0 553 806 B1 | 5/1998 |
| EP | 0 926 165 A1 | 6/1999 |
| EP | 0 856 013 B1 | 7/2000 |
| EP | 0 713 886 B1 | 11/2001 |
| WO | WO97/14723 | 4/1997 |
| WO | WO98/44009 | 10/1998 |
| WO | WO-00/08073 | 2/2000 |
| WO | WO-00/08074 | 2/2000 |
| WO | WO 01/55230 A1 | 8/2001 |

OTHER PUBLICATIONS

International Search Report for PCT/EP02/06713 mailed Oct. 29, 2002.

* cited by examiner

*Primary Examiner*—Aileen Felton
*Assistant Examiner*—J. Eric McDonough
(74) *Attorney, Agent, or Firm*—McDonnell Boehnen Hulbert & Berghoff LLP (57) ABSTRACT

Process for preparing an olefin polymerisation catalyst component in the form of particles having a predetermined size range, said process comprising the steps of a) preparing a solution of a complex of a Group 2 metal and an electron donor by reacting a compound of said metal with said electron donor or a precursor thereof in an organic liquid reaction medium; b) adding said solution of said complex to at least one compound of a transition material to produce an emulsion, the dispersed phase of which contains more than 50 mol % of the Group 2 metal in said complex; c) agitating the emulsion, optionally in the presence of an emulsion stabilizer, in order to maintain the droplets of said dispersed phase within the average size range 5 to 200 m; d) solidifying said droplets of the dispersed phase; and e) recovering the solidified particles of the olefin polymerisation catalyst component, wherein a turbulence minimizing agent (TMA) is added to the reaction mixture before solidifying said droplets of the dispersed phase, said TMA being inert and soluble in the reaction mixture under the reaction conditions.

45 Claims, 4 Drawing Sheets

PROCESS FOR PREPARING AN OLEFIN POLYMERIZATION CATALYST COMPONENT

The invention relates to a process for preparing a particulate olefin polymerisation catalyst component, particularly one comprising a Group 2 metal, a compound of a transition metal and an electron donor. The invention also relates to the use of such a catalyst component for preparing a catalyst used in the polymerisation of olefins.

BACKGROUND OF THE INVENTION

Processes for the preparation of such a catalyst component—as described, for instance, in WO 00/08073 and 00/08074—usually include a step in which a magnesium-Group 4 metal-electron donor component is recovered by precipitation from solution, typically by contacting the solution with a large amount of an aliphatic hydrocarbon. However, such precipitation leads to a tar-like reaction product of low catalytic activity, that needs to be washed several times in order to decrease the amount of inactive Group 4 metal complex. Aromatic hydrocarbons have also been used for the precipitation, but they lead to a very finely divided precipitate which is difficult to deposit. Worse still, it is difficult to carry out such precipitation in a controlled and reproducible manner, leading to unsatisfactory product morphology. Moreover variable and low concentrations of catalyst constituents such as butyl chloride may result, as a consequence of precipitation evaporative removal of aliphatic solvent.

DESCRIPTION OF THE INVENTION

It has been surprisingly found by the inventors of the present invention that a uniform particle size distribution can be obtained by the new way of preparing Ziegler-Natta (ZN) type catalysts, in particular for propylene polymerisation. The produced catalysts according to the invention have excellent morphology and good particle size distribution. According to the replica effect, the polymer particles produced by using the inventive catalyst have very good morphological properties, too. The inventive catalyst preparation is based on a liquid/liquid two phase system where no separate carrier materials such as silica are needed in order to get solid catalyst particles. Basis principles of this liquid/liquid two phase system method are described in the following in more detail.

The new inventive method can be easily scaled up in order to avoid common up-scaling problems in the prior art which led to unsatisfied catalyst morphology and particle size distribution.

Besides the two-phases preparation method, an important feature of the present invention is the use of turbulence minimizing agent (TMA). By using said TMA, catalyst component particles can be obtained, said particles having very sharp size distribution and generally having an average size range of 5 to 200 μm depending on the specific conditions.

Though the mechanism of action of said TMA is not fully understood, it is assumed that said TMA serves for a grain size limitation by reducing the turbulences in the emulsion during agitation, thus leading to a more uniform grain formation. Most probably, the mixing energy is better distributed into the emulsion. Further reasons might be seen in an interaction of the TMA with the surface of the grain, leading to a size limitation of the grain.

According to the present invention, a process for preparing an olefin polymerisation catalyst component in the form of particles having a predetermined size range is provided, said process comprising the steps of:
  a) preparing a solution of a complex of a Group 2 metal and an electron donor by reacting a compound of said metal with said electron donor or a precursor thereof in an organic liquid reaction medium;
  b) adding said solution of said complex to at least one compound of a transition metal to produce an emulsion the dispersed phase of which contains more than 50 mol % of the Group 2 metal in said complex;
  c) agitating the emulsion, optionally in the presence of an emulsion stabilizer, in order to maintain the droplets of said dispersed phase within the average size range 5 to 200 μm;
  d) solidifying said droplets of the dispersed phase; and
  e) recovering the obtained solidified particles of the olefin polymerisation catalyst component,
  wherein a turbulence minimizing agent is added to the reaction mixture before solidifying said droplets of the dispersed phase, said TMA being inert and soluble in the reaction mixture under the reaction conditions.

Preferably, the inventive process further comprises washing and drying said recovered solidified particles to obtain said catalyst component in a purified form.

As pointed out above, one important aspect of the invention is the addition of the TMA or mixtures thereof to the reaction mixture in order to minimize or to avoid turbulences in the mixture. Reaction mixture here means the solution from the initial organic liquid reaction medium, over the solution of the complex up to the emulsion before solidifying the particles of the dispersed phase of the emulsion. Preferably, the TMA is added to the reaction mixture when the emulsion is formed. Experiments of the inventors have shown that the TMA has to be added to the reaction mixture in any case before solidification of the droplets of the dispersed phase starts in order to make sure that a quite uniform particle size distribution can be obtained.

Said TMA agent has to be inert under the reaction conditions and soluble in the reaction mixture under the reaction conditions, which means that preferably polymers without polar groups are preferred.

Accordingly, said TMA or mixtures thereof are preferred as polymers having linear aliphatic carbon backbone chains, which might be branched with short side chains only in order to serve for uniform flow conditions when stirring. Said TMA is in particular preferably selected from α-olefin polymers having a high molecular weight of MW about 1-40×10$^6$, or mixtures thereof. Especially preferred are polymers of α-olefin monomers with 6 to 20 carbon atoms, most preferable is polydecene.

In more detail, the turbulence minimizing agent is preferably selected from the group consisting of inert poly($C_6$-$C_{20}$)-olefines or mixtures thereof, and more preferably from polyoctene, polynonene, polydecene, polyundecene or polydodecene or mixtures thereof, having the molecular weight and general backbone structure as defined before.

Usually, said turbulence minimizing agent can be added in any process step before particle formation starts, i.e. commonly before or at the latest before solidification of the emulsion, and is added to the emulsion in an amount of 1 to 1.000 ppm, preferably 5 to 100 ppm and more preferable 5 to 50 ppm, based on the total weight of the reaction mixture.

As explained above, the present invention relates to a method of improving (narrowing) the particle size distribution (PSD) of the catalyst, which is prepared according to the liquid/liquid two phase emulsion technique. As furthermore mechanical factors like reactor shape and size, mixer type and shape and the batch size have an effect on the turbulence and other flowing properties of the fluid, the PSD of the catalyst has been observed to be influenced, too. It has now been found by the inventors here that, by minimizing the turbulence of the fluid, the PSD is improved. Therefore, as further means for reducing turbulences which might aid in addition to or instead of using the TMA, reduced stirring speeds and/or correspondingly adapted equipment for reducing turbulences might be considered according to the invention.

According to the common knowledge in the emulsion field, vigorous mixing is usually required in order to get desired effect. Now, it has been found by the inventors here that the turbulences should be minimized in order to avoid irregular size distribution including agglomerations and fines. Therefore, the speed and means for agitating the emulsion and/or the amount and kind of said turbulence minimizing agent are adjusted according to the invention in order to obtain catalyst component particles having an average size range of 5 to 200 μm, preferably 10 to 100 μm. By using TMA in the catalyst preparation the catalyst preparation process will be less sensitive to the external variants, such as stirring equipment, reactor shape etc. and thus leading to a broader processing window.

The Group 2 metal used in step a of the inventive process is preferably magnesium, and the liquid organic medium comprises preferably a $C_6$-$C_{10}$ aromatic hydrocarbon, preferably toluene. As electron donor compound to be reacted with the Group 2 metal compound is preferably an mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferable dioctyl phthalate.

The reaction for the preparation of the Group 2 metal complex is generally carried out at a temperature of 20° to 80° C., and in case that the Group 2 metal is magnesium, the preparation of the magnesium complex is carried out at a temperature of 500 to 70° C.

The compound of a transition metal is preferably a compound of a Group 4 metal. The Group 4 metal is preferably titanium, and its compound to be reacted with the complex of a Group 2 is preferably a halide.

In a further embodiment of the invention, a compound of a transition metal used in the process can also contain organic ligands typically used in the field known as a single site catalyst.

In a still further embodiment of the invention, a compound of a transition metal can also be selected from Group 5 metals, Group 6 metals, Cu, Fe, Co, Ni and/or Pd compounds.

The complex of the Group 2 metal is preferably a magnesium complex. The invention will henceforth be described in relation to a preferred embodiment of the process, namely to a process for the preparation of a Ziegler-Natta type catalyst.

In a preferred embodiment, the present invention is directed to a process for producing catalysts of the Ziegler-Natta type in the form of particles having a predetermined size range, said process comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one fourvalent Group 4 metal at a temperature greater than 10° C. and less than 60° C. to produce an emulsion of a denser, $TiCl_4$/toluene-insoluble, oil dispersed phase having, Group 4 metal/Mg mol ratio 0.1 to 10 in an oil disperse phase having Group 4 metal/Mg mol ratio 10 to 100; agitating the emulsion, optionally in the presence of an emulsion stabilizer, in order to maintain the particles of said dispersed phase within the average size range 5 to 200 μm, and solidifying said particles of the dispersed phase by heating The said disperse and dispersed phases are thus distinguishable from one another by the fact that the denser oil, if contacted with a solution of titanium tetrachloride in toluene, will not dissolve in it. A suitable solution for establishing this criterion would be one having a toluene mol ratio of 0.1 to 0.3. They are also distinguishable by the fact that the great preponderance of the Mg provided (as complex) for the reaction with the Group 4 metal compound is present in the dispersed phase, as revealed by comparison of the respective Group 4 metal/Mg mol ratios.

In effect, therefore, virtually the entirety of the reaction product of the Mg complex with the Group 4 metal—which is the precursor of the ultimate catalyst component—becomes the dispersed phase, and proceeds through the further processing steps to the final dry particulate form. The disperse phase, still containing a useful quantity of Group 4 metal, can be reprocessed for recovery of that metal.

The production of a two-phase, rather than single-phase (as in prior practice) reaction product is encouraged by carrying out the Mg complex/Group 4 metal compound reaction at low temperature, specifically above 10° C. but below 60° C., preferably between above 20° C. and below 50° C. Since the two phases will naturally tend to separate into a lower, denser phase and supernatant lighter phase, it is necessary to maintain the reaction product as an emulsion by agitation, preferably in the presence of an emulsion stabiliser.

The resulting particles from the dispersed phase of the emulsion are of a size, shape (spherical) and uniformity which render the ultimate catalyst component extremely effective in olefin polymerisation. This morphology is preserved during the heating to solidify the particles, and of course throughout the final washing and drying steps. It is, by contrast, difficult to the point of impossibility to achieve such morphology through precipitation, because of the fundamental uncontrollability of nucleation and growth, and the large number of variables which affect these events.

The electron donor is preferably an aromatic carboxylic acid ester, a particularly favoured ester being dioctyl phthalate. The donor may conveniently be formed in situ by reaction of an aromatic carboxylic acid chloride precursor with a $C_2$-$C_{16}$ alkanol and/or diol. The liquid reaction medium preferably comprises toluene.

Furthermore, emulsifying agents/emulsion stabilisers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$ to $C_{20}$ acrylates such as poly(hexadecyl)-methacrylate and poly(octadecyl)-methacrylate.

It has been found that the best results are obtained when the Group 4 metal/Mg mol ratio of the denser oil is 1 to 5, preferably 2 to 4, and that of the disperse phase oil is 55 to 65. Generally the ratio of the mol ratio Group 4 metal/Mg in the disperse phase oil to that in the denser oil is at least 10.

Solidification of the dispersed phase droplets by heating is suitably carried out at a temperature of 70-150° C., usually at 90-110° C. Preparation of the magnesium complex may be carried out over a wide range of temperatures, 20 to 80° C. being preferred, 50 to 70° C. most preferred.

The finally obtained catalyst component is desirably in the form of particles having an average size range of 5 to 200 µm, preferably 10 to 100, more preferably 20 to 50 µm.

The present invention further comprehends an olefin polymerisation catalyst comprising a catalyst component prepared as aforesaid, in association with an alkyl aluminium cocatalyst and optionally donors, and the use of that polymerisation catalyst for the polymerisation Of $C_2$ to $C_{10}$-olefins.

The reagents can be added to the aromatic reaction medium in any order. However it is preferred that in a first step the alkoxy magnesium compound is reacted with a carboxylic acid halide precursor of the electron donor to form an intermediate; and in a second step the obtained product is further reacted with the Group 4 metal. The magnesium compound preferably contains from 1 to 20 carbon atoms per alkoxy group, and the carboxylic acid should contain at least 8 carbon atoms.

Reaction of the magnesium compound, carboxylic acid halide and polyhydric alcohol proceeds satisfactorily at temperatures in the range 20 to 80° C., preferably 50 to 70° C. The product of that reaction, the "Mg complex", is however reacted with the Group 4 metal compound at a lower temperature, contrary to previous practice, to bring about the formation of a two-phase, oil-in-oil, product.

Use of an aromatic medium for preparation of the Mg complex contributes to consistent product morphology and higher bulk density. Catalyst bulk density and morphology correlate with product bulk density and morphology the so-called "replication effect".

The technique adopted in the novel regimen of the invention is inherently more precise than that formerly employed, and thus further contributes to product consistency, as well as sharply reducing the volumes of solvent to be handled and thus improving process economics.

The reaction medium used as solvent can be aromatic or a mixture of aromatic and aliphatic hydrocarbons, the latter one containing preferably 5-9 carbon atoms, more preferably 5-7 carbon atoms, or mixtures thereof. Preferably, the liquid reaction medium used as solvent in the reaction is aromatic and is more preferably selected from hydrocarbons such as substituted and unsubstituted benzenes, preferably from alkylated benzenes, even more preferably from toluene and the xylenes, and is most preferably toluene. The molar ratio of said aromatic medium to magnesium is preferably less than 10, for instance from 4 to 10, preferably from 5 to 9.

The recovered particulate product is washed at least once, preferably at least twice, most preferably at least three times with a hydrocarbon, which preferably is selected from aromatic and aliphatic hydrocarbons, preferably with toluene, particularly with hot (e.g. 90° C.) toluene, which might include a small amount, preferably a few vol-%, such as about 5 vol-% of $TiCl_4$ in it. A further wash is advantageously performed with heptane, most preferably with hot (e.g. 90° C.) heptane, and yet a further wash with pentane. A washing step typically includes several substeps. A favoured washing sequence is, for example, one wash with toluene at 90° C., two washes with heptane at 90° C. and one or two washes with pentane at room temperature.

The washing can be optimized to give a catalyst with novel and desirable properties. Finally, the washed catalyst component is dried, as by evaporation or flushing with nitrogen.

It is preferable that the intermediates as well as the final product of the process be distinct compounds with an essentially stoichiometric composition. Often, they are complexes. A complex is, according to Römpps Chemie-Lexicon, 7. Edition, Franckh'sche Verlagshandlung, W. Keller & Co., Stuttgart, 1973, page 1831, "a derived name of compounds of higher order, which originate from the combination of molecules,—unlike compounds of first order, in the creation of which atoms participate".

The alkoxy magnesium compound group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R_2Mg$, wherein each one of the two Rs is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react with a polyhydric alcohol $R'(OH)_m$, or a mixture thereof with a monohydric alcohol R'OH.

Typical $C_2$ to $C_6$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentareythritol. The polyhydric alcohol can be selected on the basis of the activity and morphology it ,gives the catalyst component.

The aromatic reaction medium may also contain a monohydric alcohol, which may be straight- or branched-chain. Typical $C_1$-$C_{20}$ monohydric alcohols are methanol, ethanol, n-propanol, iso-propanol, n-butanol, iso-butanol, sec.butanol, tert.butanol, n-amyl alcohol, iso-amyl alcohol, sec.amyl alcohol, tert.amyl alcohol, diethyl carbinol, akt. amyl alcohol, sec. isoamyl alcohol, tert.butyl carbinol. Typical $C_6$-$C_{10}$ monohydric alcohols are hexanol, 2-ethyl-lbutanol, 4-methyl-2-pentanol, 1-heptanol, 2-heptanol, 4-heptanol, 2,4-dimethyl-3pentanol, 1-octanol, 2-octanol, 2-ethyl-1-hexanol, 1-nonanol, 5-nonanol, dilsobutyl carbinol, 1-decanol and 2,7-dimethyl-2-octanol. Typical >$C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1 octadecanol. The monohydric alcohols may be unsaturated, as long as they do not act as catalyst poisons.

Preferable monohydric alcohols are those of formula R'OH in which R' is a $C_2$-$C_{16}$ alkyl group, most preferably a $C_4$-$C_{12}$ alkyl group, particularly 2-ethyl-1-hexanol.

Preferably, essentially all of the aromatic carboxylic acid ester is a reaction product of a carboxylic acid halide, preferably a dicarboxylic acid dihalide, more preferably an unsaturated α,β-dicarboxylic acid dihalide, most preferably phthalic acid dichloride, with the monohydric alcohol.

The compound of a fourvalent Group 4 metal compound containing a halogen is preferably a titanium tetrahalide. Equivalent to titanium tetrahalide is the combination of an alkoxy titanium halide and a halogenation agent therefore, which are able to form a titanium tetrahalide in situ. The most preferred halide is the chloride, for zirconium and hafnium as well as for titanium.

The reaction conditions used in the claimed process may be varied according to the used reactants and agents.

As is known, the addition of at least one halogenated hydrocarbon during the process can lead to further improved catalytic activity. Reactive halogenated hydrocarbons preferably have the formula $R'''X'''_n$, wherein R''' is an n-valent $C_1$-$C_{20}$ hydrocarbyl group, particularly a $C_1$-$C_{10}$ paraffin, X''' is a halogen and n is an integer from 1 to 4.

Such chlorinated hydrocarbons include monochloromethane, dichloromethane, trichloromethane (chloroform), tetrachloromethane, monochloroethane, (1,1)-dichloroethane, (1,2)-dichloroethane, (1,1,1)-trichloroethane, (1,1,2)-trichloroethane, (1,1,1,2)-tetrachloroethane, (1,1,2,2) tetrachloroethane, pentachloroethane, hexachloroethane, (1)-chloropropane, (2)-chloropropane, (1,2)-dichloropropane, (1,3)-dichloropropane, (1,2,3)trichloropropane, (1)-chlorobutane, (2)-chlorobutane, isobutyl chloride, tert.butyl chloride, (1,4)-dichlorobutane, (1)-chloropentane, (1,5)-dichloropentane. The chlorinated hydrocarbons may also be unsaturated, provided that the unsaturation does not act as catalyst poison in the final catalyst component.

In the above formula, R''' is preferably a mono-or bivalent $C_1$-$C_{10}$ alkyl group , independently, X''' is preferably chlorine and, independently, n is preferably 1 or 2. Preferred compounds include butyl chloride (BuCl), dichloroalkanes such as (1,4)-dichlorobutane, and tertiary butyl chloride.

Though the catalyst preparation according to the inventive method can be carried out batchwise, it is also preferable and possible to prepare the catalyst component semi-continuously our continuously. In such semi-continuous or continuous process, the solution of the complex of the group 2 metal and said electron donor, which is prepared by reacting the compound of said metal with said electron donor in an organic liquid reaction medium, is mixed with at least one compound of a transition metal, which might be solved in the same or different organic liquid reaction medium. The so obtained solution is then agitated, possibly in the presence of an emulsion stabilizer, and then the so-agitated emulsion is fed into a temperature gradient reactor, in which the emulsion is subjected a temperature gradient, thus leading to solidifying the droplets of a dispersed phase of the emulsion. The TMA is preferably contained in the solution of the complex or added to the solution before feeding the agitated solution to the temperature gradient reactor.

When feeding said agitated emulsion to the temperature gradient reactor, an inert solvent, in which the droplets are not soluble, can additionally be fed into that gradient reactor in order to improve the droplet formation and thus leading to a uniform grain size of the particles of the catalyst component, which are formed in the temperature gradient reactor when passing through said line. Such additional solvent might be the same as the organic liquid reaction medium, which is used for preparing the solution of the complex of the group 2 metal as explained above in more detail.

The solidified particles of the olefin polymerisation catalyst component can subsequently be recovered by an instream filtering unit and then, optionally after some additional washing and drying steps in order to remove unreacted starting components, can be stored for further use. In one embodiment the catalyst can be fed after washing steps into the olefin polymerisation reactor, so that a continuous preparation and fed to the reactor is guaranteed.

As it can be seen from the above description of the semi-continuous or continuous process, it is thus possible to use separated reaction vessels for the different process steps and to transfer the reaction products which are prepared in the respective reaction vessels and to fed them in-line into further reaction vessels for formation of the emulsion and, subsequently, of the solidified particles.

It is preferred to use a full-continuous process as the time saving in said process is remarkable. In such fully continuous process, the formation of the solidified particles could be carried out in the temperature gradient line in the kind of pipe reactor, which is sufficiently long and which is subjected said temperature gradient from the starting temperature in the lower range of 20 to 80° C. up to a "solidifying" temperature of 70 to 150° C. The temperature gradient is preferably obtained by means of heating the pipe reactor from the outside by applying normal heaters, microwaves, etc.

As mentioned before, a filtering unit might preferably be used for filtering the solidified particles from the solvent stream. For said filtering unit, various drums and sieving systems can be used, depending on the specific particle sizes.

Some preferred embodiments of the invention are described, by way of illustration, in the following Examples.

In said Examples, Example 1 describes, in accordance with the invention, the use of a turbulence minimising agent in the emulsion system, being in Example 1 polydecene, and Examples 2, 3 and 4 are Comparison Examples without using said turbulence minimising agent with the same and different stirring speeds. Examples 5 to 8 are examples in accordance with the invention, making use of a turbulence minimising agent in the emulsion system, in the examples polydecene in differing amounts.

In the examples the following measuring methods were used:

Melt Flow Rate, MFR: ISO 1133; 230° C., 2.16 kg load
Xylene solubles, XS: Xylene soluble fraction of product at 25° C.
Polymer Bulk Density, BD: ASTM D 1895 Particle Size Distribution, PSD: Measured by Coulter Counter LS 200 at room temperature wih n-heptane as medium.

EXAMPLES

Example 1

Preparation of the Soluble Mg-Complex

In a 150 l steel reactor 19,4 kg of 2-ethyl hexanol were added at 20° C. 56,0 kg of a 20% BOMAG A (Tradename) [$Mg(Bu)_{1.5}(Oct)_{0.5}$] solution in toluene were then slowly added to the well stirred alcohol. The temperature of the mixture was then increased to 60° C., and the reactants were allowed to react for 30 minutes at this temperature.

After addition of 5.5 kg of 1,2-phthaloyl dichloride, the reaction mixture was stirred at 60° C. for another 30 minutes to ensure complete reaction. 13.8 kg of 1-chloro butane were then added at 60° C., and stirring at this temperature was continued for 30 minutes. After cooling to room temperature a yellow solution was obtained.

Preparation of the Catalyst Component 100 ml titanium tetrachloride were placed in a 1 l reactor equipped with a mechanical stirrer. After addition of 40.0 ml n-pentane, 157.0 g of the Mg-complex was added to the well-stirred reaction mixture at 25° C. within 4 minute. After addition a dark red emulsion was formed. Then 10 mg of polydecene polymer dissolved in 5 ml of toluene was added.

After addition of the polydecene, the stirring speed was increased from 110 rpm to 180 rpm. After addition of 8 ml of Viscoplex 1-254 (Tradename) (40-44% of acrylic polymer in base oil), the temperature of the reactor was increased to 90° C. and stirring at this temperature was continued for 30 min.

After settling and filtering, the solid was washed with mixture of 500 ml of toluene and 25 ml $TiCl_4$ at 90° C. for 35 min. Then the washings were continued with two times 300 ml heptane and once with 300 ml pentane. The first heptane washing took 20 min at 90° C. and the second one 10 min. During the second heptane wash the temperature was decreased down to c. 30° C. The pentane washing was then carried out for 2 min at c. 30° C. Finally, the solid catalyst was dried at 60° C. by purging nitrogen through the catalyst bed.

| Catalyst composition | | | |
|---|---|---|---|
| Ti % | Mg % | Cl % | DOP %* |
| Example 1 2.7 | 14.3 | 49.8 | 23.2 |

*di-octyl-phtalate (di(2-ethyl-hexyl-phtalate))

Figure 1:
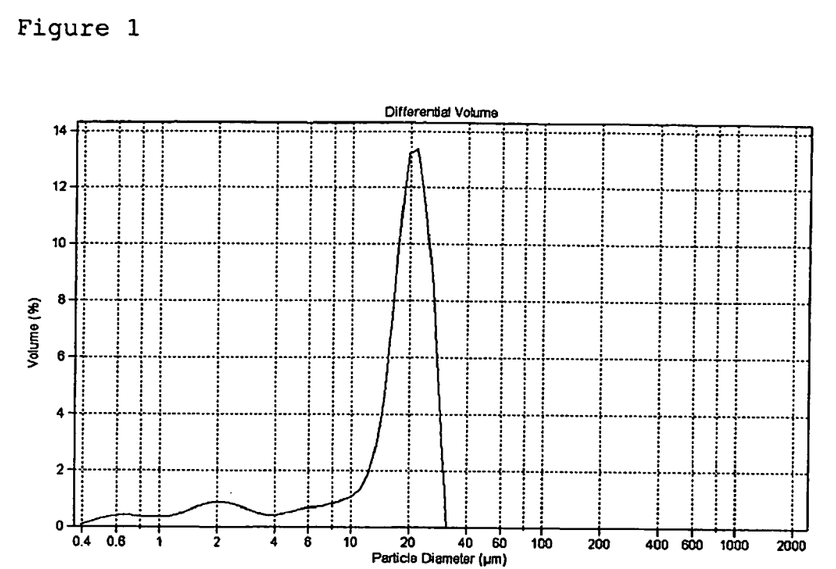
FIG. 1: is a graph illustrating the particle size distribution of Example 1.

The catalyst particle size distribution by Coulter is shown in FIG. 1.

Bulk Polymerisation of Propylene

The propylene bulk polymerisation was carried out in a stirred 5 l tank reactor. About 0.9 ml triethyl aluminium (TEA) as a co-catalyst, 0.12 ml cyclohexyl methyl dimethoxy silane (CMMS) as an external donor and 30 ml n-pentane were mixed and allowed to react for 5 minutes. Half of the mixture was then added to the polymerisation reactor and the other half was mixed with about 20 mg of a catalyst.

After additional 5 minutes the catalyst/TEA/donor/n-pentane mixture was added to the reactor. The Al/Ti mole ratio was 250 mol/mol and the Al/CMMS mole ratio was 10 mol/mol. 70 mmol hydrogen and 1400 g propylene were introduced into the reactor and the temperature was raised within ca 15 minutes to the polymerisation temperature of 70° C. The polymerisation time at 70° C. was 60 minutes, after which the polymer formed was taken out from the reactor.

| Polymerisation results | | | | |
|---|---|---|---|---|
| Catalyst component | Activity kgPP/gCat | MFR g/10 min | XS % | BD g/ml |
| Example 1 | 33.0 | 7.1 | 2.6 | 0.46 |

| Polymer particle size distribution by sieving % polymer on sieves | | | | | | | |
|---|---|---|---|---|---|---|---|
| 4 mm | 2 mm | 1 mm | 0.5 mm | 0.18 mm | 0.1 mm | 0.056 mm | pan |
| 0.0 | 0.2 | 1.8 | 86.5 | 9.3 | 1.7 | 0.4 | 0 |

Example 2, Comparative

Preparation of the Catalyst Component 100 ml titanium tetrachloride were placed in a 1 l reactor equipped with a mechanical stirrer. After addition of 40.0 ml n-pentane, 157.0 g of the Mg-complex was added to the well-stirred reaction mixture at 25° C. within 2 minute. After addition a dark red emulsion was formed.

After addition of the Mg-complex, mixing speed was increased from 110 rpm to 180 rpm. After addition of 8 ml of Viscoplex 1-254, the temperature of the reactor was increased to 90° C. and stirring at this temperature was continued for 30 min.

After settling and filtering, the solid was washed with mixture of 250 ml of toluene and 12.5 ml $TiCl_4$ at 90° C. for 5 min. Then the washings were continued with two times 300 ml heptane and once with 300 ml pentane. The heptane washings took 10 min each and during the second heptane wash the temperature was decreased down to c. 30° C. The pentane washing was then carried out for 2 min at c. 30° C. Finally, the solid catalyst was dried at 60° C. by purging nitrogen through the catalyst bed.

Th polymerisation was carried out as in Example 1.

| Catalyst composition | | | |
|---|---|---|---|
| Ti % | Mg % | Cl % | DOP % |
| Example 2 2.4 | 15.0 | 50.9 | 26.6 |

Figure 2:
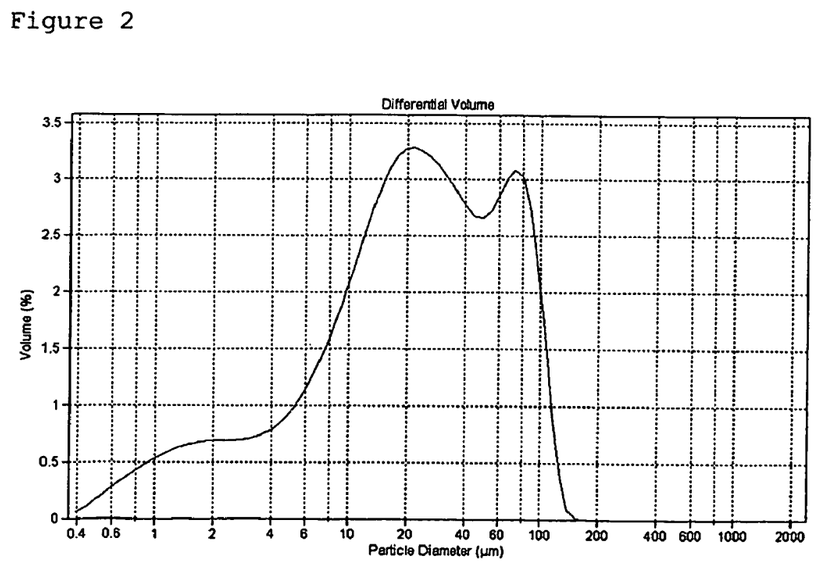
FIG. 2: is a graph illustrating the particle size distribution of Example 2.

The catalyst particle size distribution by Coulter is shown in FIG. 2.

Polymerisation results

| Catalyst component | Activity kgPP/gCat | MFR g/10 min | XS % | BD g/ml |
|---|---|---|---|---|
| Example 2 | 24.1 | 6.7 | 2.1 | 0.45 |

Polymer particle size distribution by sieving
% polymer on sieves

| 4 mm | 2 mm | 1 mm | 0.5 mm | 0.18 mm | 0.1 mm | 0.056 mm | pan |
|---|---|---|---|---|---|---|---|
| 2.4 | 27.7 | 20.2 | 25.2 | 21.4 | 2.7 | 0.4 | 0 |

Example 3, Comparative

Preparation of the Catalyst Component 100 ml titanium tetrachloride were placed in a 1 l reactor equipped with a mechanical stirrer. After addition of 40.0 ml n-pentane, 157.0 g of the Mg-complex was added to the well-stirred reaction mixture at 25° C. within 2 minute. After addition a dark red emulsion was formed.

After addition of the Mg-complex, mixing speed was increased from 110 rpm to 130 rpm. After addition of 8 ml of Viscoplex 1-254, the temperature of the reactor was increased to 90° C. and stirring at this temperature was continued for 30 min. After settling and filtering, the solid was washed with mixture of 500 ml of toluene and 25 ml TiCl$_4$ at 90° C. for 35 min. Then the washings were continued with two times 300 ml heptane and once with 300 ml pentane. The first heptane wash took 20 min at 90° C. and the second one 10 min. During the second heptane wash the temperature was decreased down to c. 30° C. The pentane wash was then carried out for 2 min at c. 30° C. Finally the solid catalyst was dried at 60° C. by purging nitrogen through the catalyst bed.

The polymerisation was carried out as in Example 1.

Catalyst composition

| | Ti % | Mg % | Cl % | DOP % |
|---|---|---|---|---|
| Example 3 | 2.2 | 14.8 | 49.8 | 29.9 |

Figure 3:
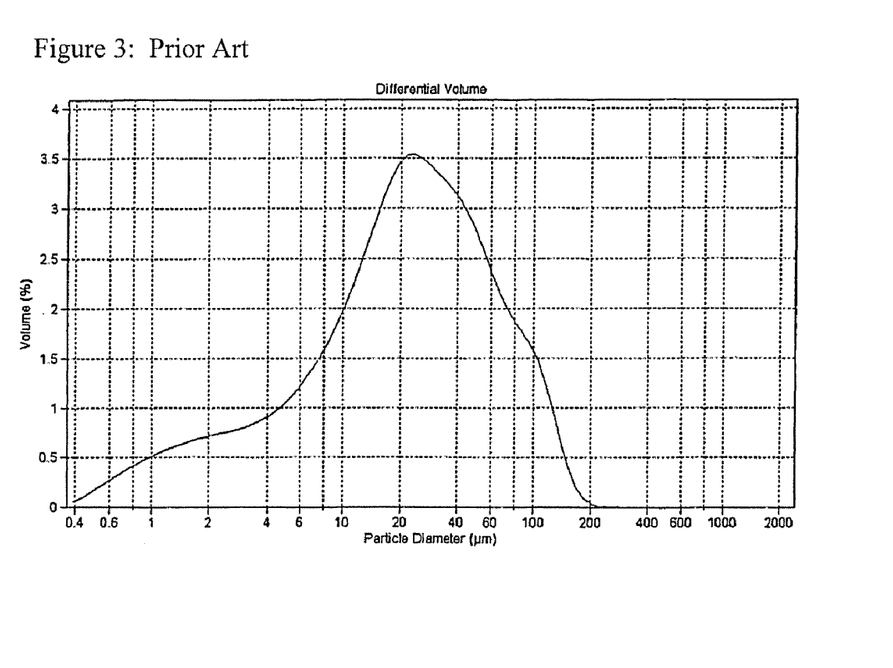
FIG. 3: is a graph illustrating the particle size distribution according to comparative Example 3.

The catalyst particle size distribution by Coulter is shown in FIG. 3.

Polymerisation results

| | Activity KgPP/gCat | MFR g/10 min | XS % | BD g/ml |
|---|---|---|---|---|
| Example 3 | 23.6 | 4.9 | 1.6 | 0.5 |

Polymer particle size distribution by sieving
% polymer on sieves

| 4 mm | 2 mm | 1 mm | 0.5 mm | 0.18 mm | 0.1 mm | 0.056 mm | pan |
|---|---|---|---|---|---|---|---|
| 10.9 | 22.6 | 17.5 | 23.7 | 20.8 | 3.9 | 0.5 | 0.1 |

Example 4, Comparative

Preparation of the Soluble Mg-Complex

In a 150 l steel reactor 19.4 kg of 2-ethyl hexanol were added at 20° C. 55.8 kg of a 20% BOMAG A solution in toluene were then slowly added to the well stirred alcohol. The temperature of the mixture was then increased to 60° C., and the reactants were allowed to react for 30 minutes at this temperature. After addition of 5.5 kg of 1,2-phthaloyl dichloride, the reaction mixture was stirred at 60° C. for another 30 minutes to ensure complete reaction. After cooling to room temperature a yellow solution was obtained.

Preparation of the Catalyst Component 100 ml titanium tetrachloride were placed in a 1 l reactor equipped with a mechanical stirrer. Mixing speed was adjusted to 110 rpm. After addition of 50.0 ml n-heptane, 180.0 ml of the Mg-complex was added to the well-stirred reaction mixture at 25° C. within 10 minute. After addition a dark red emulsion was formed. Then 10 ml of Viscoplex 1-254 was added. 10 min after addition the temperature of the reactor was increased to 90° C. and stirring at this temperature was continued for 30 min. After settling and filtering, the solid was washed with 200 ml of toluene at 90° C. for 35 min. Then the washings were continued with two times 150 ml heptane á 10 min. Then the catalyst was taken out from the reactor to separate drying vessel as a slurry with 100 ml of heptane. Finally, the solid catalyst was dried at 60° C. by purging nitrogen through the catalyst bed.

Catalyst composition

| | Ti % | Mg % | Cl % | DOP % |
|---|---|---|---|---|
| Example 4 | 2.7 | 13.4 | 47.2 | 32.4 |

Figure 4:
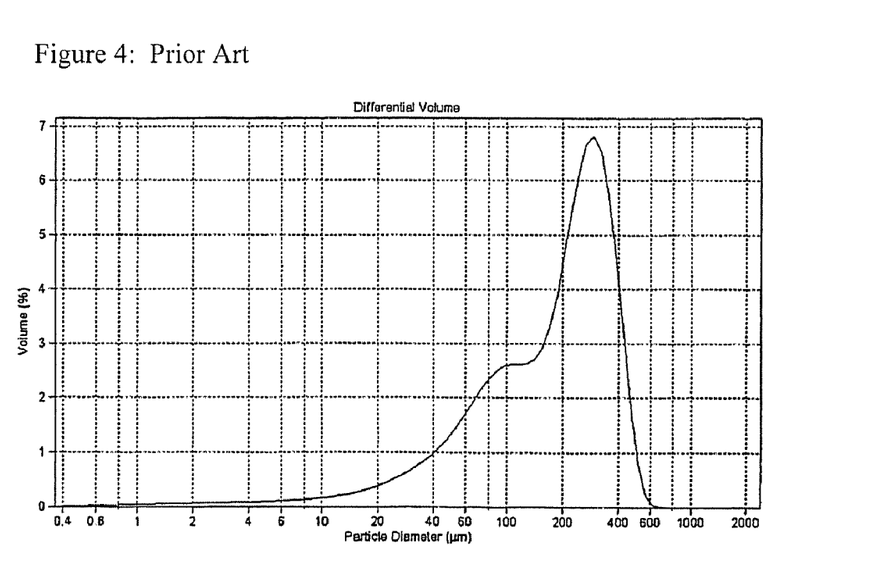
FIG. 4: is a graph illustrating the particle size distribution according to comparative Example 4.

The catalyst particle size distribution by Coulter is shown in FIG. 4.

Bulk Polymerisation of Propylene

The propylene bulk polymerisation was carried out in a stirred 5 l tank reactor. About 0.9 ml triethyl aluminium (TEA) as a co-catalyst, ca 0.12 ml cyclohexyl methyl dimethoxy silane (CMMS) as an external donor and 30 ml n-pentane were mixed and allowed to react for 5 minutes. Half of the mixture was then added to the polymerisation reactor and the other half was mixed with about 20 mg of a catalyst. After additional 5 minutes the catalyst/TEA/donor/n-pentane mixture was added to the reactor. The Al/Ti mole ratio was 250 mol/mol and the Al/CMMS mole ratio was 10 mol/mol. 70 mmol hydrogen and 1400 g propylene were introduced into the reactor and the temperature was raised within ca 15 minutes to the polymerisation temperature of 70° C. The polymerisation time at 70° C. was 60 minutes, after which the polymer formed was taken out from the reactor.

Polymerisation results

| | Activity kgPP/gCat | MFR g/10 min | XS % | BD g/ml |
|---|---|---|---|---|
| Example 4 | 40.4 | 3.8 | 1.0 | 0.27 |

Polymer particle size distribution by sieving
% polymer on sieves

| 4 mm | 2 mm | 1 mm | 0.5 mm | 0.18 mm | 0.1 mm | 0.056 mm | pan |
|---|---|---|---|---|---|---|---|
| 58.3 | 38.3 | 3.2 | 0.1 | 0.1 | 0 | 0 | 0 |

Example 5

Preparation of the Catalyst Component (3 mg Polydecene)

100 ml titanium tetrachloride were placed in a 1 l reactor equipped with a mechanical stirrer. Mixing speed was adjusted to 110 rpm. After addition of 50.0 ml n-heptane, 180.0 ml of the Mg-complex was added to the well-stirred reaction mixture at 25° C. within 10 minute. After addition a dark red emulsion was formed. After addition of the Mg-complex, 1 ml of toluene solution containing 3 mg polydecene was added.

Then 10 ml of Viscoplex 1-254 was added. 10 min after addition the temperature of the reactor was increased to 90° C. and stirring at this temperature was continued for 30 min.

After settling and filtering, the solid was washed with 200 ml of toluene at 90° C. for 35 min. Then the washings were continued with two times 150 ml heptane á 10 min. Then the catalyst was taken out from the reactor to separate drying vessel as a slurry with 100 ml of heptane.

Finally the solid catalyst was dried at 60° C. by purging nitrogen through the catalyst bed.

The polymerisation was carried out as in example 4.

Catalyst composition

| | Ti % | Mg % | Cl % | DOP % |
|---|---|---|---|---|
| Example 2 | 2.0 | 11.6 | 39.7 | 22.0 |

Figure 5:
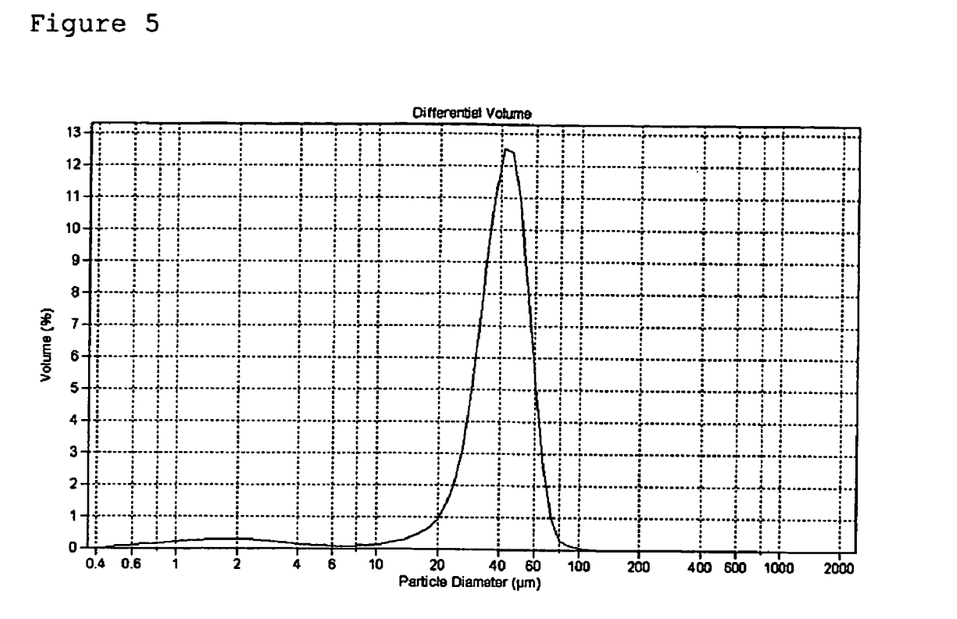
FIG. 5: is a graph illustrating the particle size distribution of Example 5.

The catalyst particle size distribution by Coulter is shown in FIG. 5.

Polymerisation results

| | Activity kgPP/gCat | MFR g/10 min | XS % | BD g/ml |
|---|---|---|---|---|
| Example 5 | 23.9 | 5.1 | 1.5 | 0.37 |

Polymer particle size distribution by sieving
% polymer on sieves

| 4 mm | 2 mm | 1 mm | 0.5 mm | 0.18 mm | 0.1 mm | 0.056 mm | pan |
|---|---|---|---|---|---|---|---|
| 0.2 | 12.8 | 68.9 | 17.1 | 0.8 | 0.1 | 0 | 0 |

Example 6

Preparation of the Catalyst Component (6 mg Polydecene)

The catalyst component was prepared as in example 5 except 6 mg polydecene in 2 ml toluene was used.

The polymerisation was carried out as in example 4.

Catalyst composition

| | Ti % | Mg % | Cl % | DOP % |
|---|---|---|---|---|
| Example 6 | 2.6 | 13.0 | 45.6 | 25.7 |

Figure 6:
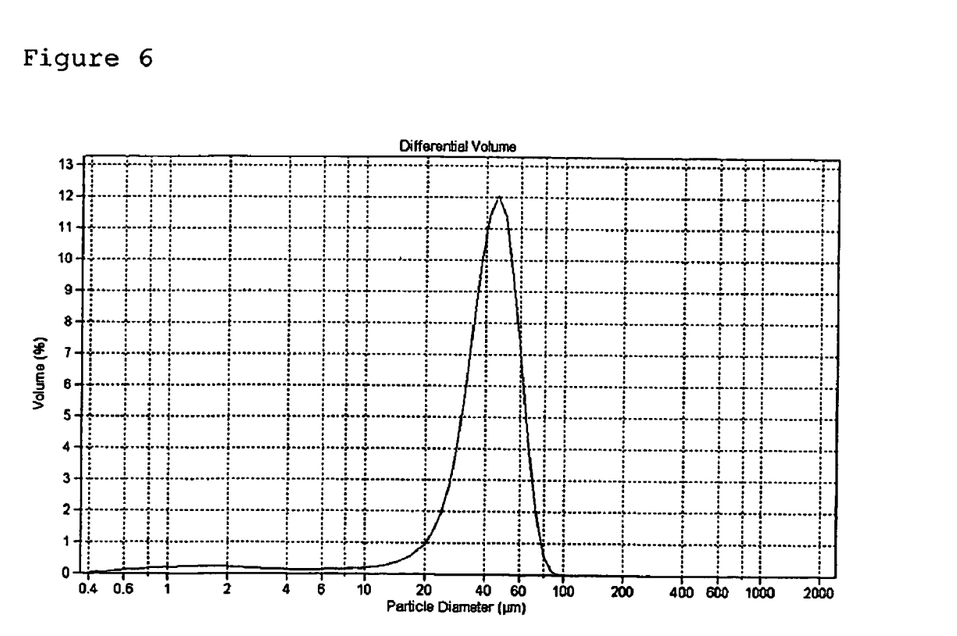
FIG. 6: is a graph illustrating the particle size distribution of Example 6.

The catalyst particle size distribution by Coulter is shown in FIG. 6.

Polymerisation results

| | Activity kgPP/gCat | MFR g/10 min | XS % | BD g/ml |
|---|---|---|---|---|
| Example 6 | 26.3 | 4.0 | 1.4 | 0.43 |

Polymer particle size distribution by sieving
% polymer on sieves

| 4 mm | 2 mm | 1 mm | 0.5 mm | 0.18 mm | 0.1 mm | 0.056 mm | pan |
|---|---|---|---|---|---|---|---|
| 0 | 20.8 | 65.9 | 12.6 | 0.6 | 0 | 0 | 0 |

Example 7

Preparation of the Catalyst Component (15 mg Polydecene)

The catalyst component was prepared as in example 5 except 15 mg polydecene in 5 ml toluene was used.

The polymerisation was carried out as in example 4.

Catalyst compositions

| | Ti % | Mg % | Cl % | DOP % |
|---|---|---|---|---|
| Example 7 | 2.4 | 12.6 | 43.9 | 25.2 |

Figure 7:
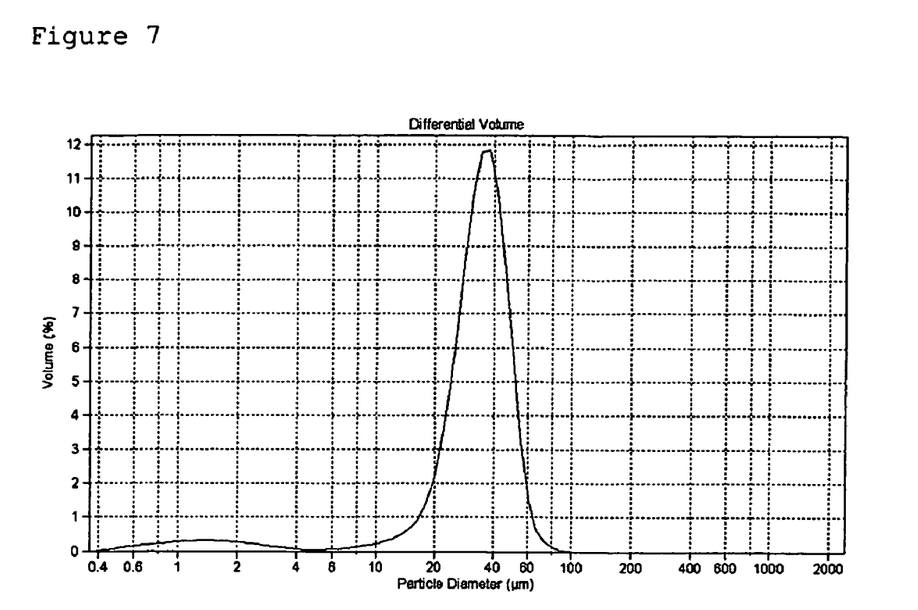
FIG. 7: is a graph illustrating the particle size distribution of Example 7.

The catalyst particle size distribution by Coulter is shown in FIG. 7.

Polymerisation results

| | Activity kgPP/gCat | MFR g/10 min | XS % | BD g/ml |
|---|---|---|---|---|
| Example 7 | 23.7 | 3.8 | 1.3 | 0.41 |

Polymer particle size distribution by sieving
% polymer on sieves

| 4 mm | 2 mm | 1 mm | 0.5 mm | 0.18 mm | 0.1 mm | 0.056 mm | pan |
|---|---|---|---|---|---|---|---|
| 0 | 6.7 | 70.5 | 22.0 | 1.0 | 0.2 | 0 | 0 |

Example 8

Preparation of the Catalyst Component (45 mg Polydecene)

The catalyst component was prepared as in example 5 except 45 mg polydecene in 15 ml toluene was used.

The polymerisation was carried out as in example 4.

Catalyst compositions

| | Ti % | Mg % | Cl % | DOP % |
|---|---|---|---|---|
| Example 5 | 2.4 | 12.5 | 43.6 | 27.3 |

Figure 8:
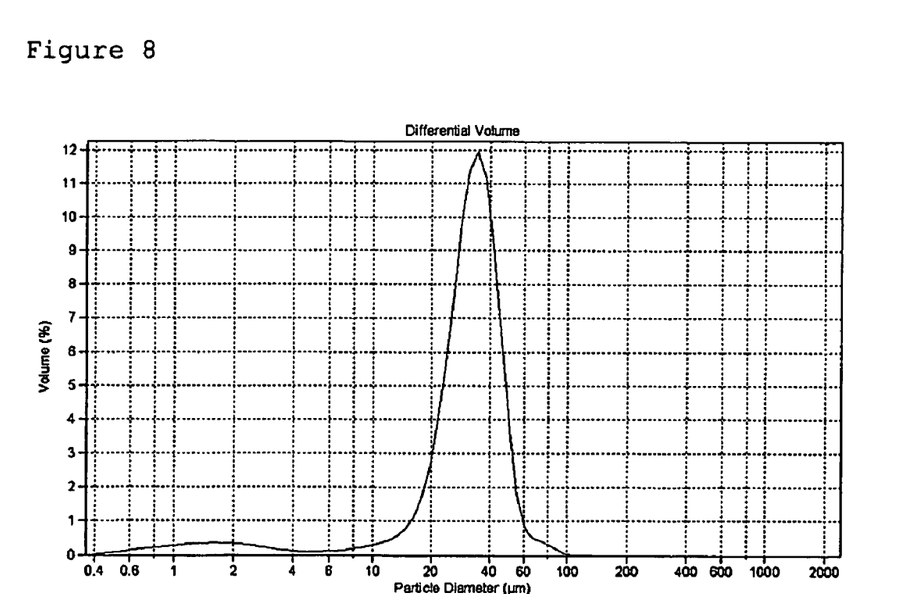
FIG. 8: is a graph illustrating the particle size distribution of Example 8.

The catalyst particle size distribution by Coulter is shown in FIG. 8.

Polymerisation results

| | Activity kgPP/gCat | MFR g/10 min | XS % | BD g/ml |
|---|---|---|---|---|
| Example 8 | 25.9 | 4.1 | 1.4 | 0.41 |

Polymer particle size distribution by sieving
% polymer on sieves

| 4 mm | 2 mm | 1 mm | 0.5 mm | 0.18 mm | 0.1 mm | 0.056 mm | pan |
|---|---|---|---|---|---|---|---|
| 0 | 3.8 | 70.6 | 24.2 | 0.9 | 0.1 | 0 | 0 |

The invention claimed is:

1. A process for preparing an olefin polymerization catalyst component in the form of particles, said process comprising:

preparing a solution of a complex of a Group 2 metal and an electron donor by reacting a compound of said Group 2 metal with said electron donor or a precursor thereof in an organic liquid reaction medium;

adding said solution of said complex to at least one compound of a transition metal to produce an emulsion having a dispersed phase comprising more than 50 mol % of the Group 2 metal in said complex;

agitating the emulsion in order to obtain droplets of said dispersed phase within the average size range of 5 to 200 μm;

solidifying said droplets of the dispersed phase to obtain particles; and recovering the solidified particles of the olefin polymerization catalyst component, wherein a turbulence minimizing agent is added to the reaction mixture before solidifying said droplets of the dispersed phase, said turbulence minimizing agent being inert and soluble in the reaction mixture under the reaction conditions.

2. The process of claim 1, further comprising washing and drying said recovered solidified particles to obtain said catalyst component.

3. A process according to claim 1 or claim 2 wherein said Group 2 metal is magnesium.

4. A process according to claim 1 or claim 2 wherein said organic liquid reaction medium comprises a $C_6$-$C_{10}$ aromatic hydrocarbon or a mixture of a $C_6$-$C_{10}$ aromatic hydrocarbon and $C_5$-$C_9$ aliphatic hydrocarbons.

5. A process according to claim 1 or claim 2 wherein said organic liquid reaction medium comprises toluene.

6. A process according to claim 1 or claim 2 wherein said electron donor is a monoester or diester of an aromatic carboxylic acid or diacid.

7. A process according to claim 6 wherein said aromatic carboxylic acid ester or diester is formed in situ by reaction of an aromatic carboxylic acid chloride or diacid dichloride with a $C_2$-$C_{16}$ alcohol and/or diol.

8. A process according to claim 6 wherein said aromatic carboxylic acid ester is dioctyl phthalate.

9. A process according to claim 1 or claim 2 wherein the preparation of the solution of the Group 2 metal complex is carried out at a temperature of 20° C. to 80° C.

10. A process according to claim 9 wherein the Group 2 metal is magnesium and the preparation of the solution of the magnesium complex is carried out at a temperature of 50° C. to 70° C.

11. A process according to claim 1 or claim 2 wherein said transition metal is a Group 4 metal, a Group 5 metal, a Group 6 metal or any mixtures thereof.

12. A process according to claim 1 or claim 2 wherein said transition metal is Cu, Fe, Co, Ni and/or Pd.

13. A process according to claim 11 wherein said Group 4 metal is titanium.

14. A process according to claim 11 wherein said compound of the transition metal is a halide.

15. A process according to claim 1 or claim 2 wherein said emulsion comprises a disperse phase with a transition metal/Group 2 metal mol ratio of 20 to 80.

16. The process according to claim 15 wherein the mol ratio of said disperse phase is 45 to 75.

17. The process according to claim 1 or claim 2 wherein said Group 2 metal complex and said transition metal compound are reacted at a temperature of 10° C. to 60° C.

18. A process according to claim 17 wherein said Group 2 metal complex is a magnesium complex and said transition metal compound is a Group 4 metal compound and wherein said magnesium complex and said Group 4 metal compound are reacted in a temperature range from 20° C. to 50° C.

19. A process according to claim 18 wherein said emulsion comprises a disperse phase oil and a denser dispersed phase oil, and wherein the Group 4 metal/Mg mol ratio of said dispersed phase oil is 2 to 4 and that of the disperse phase oil is 55 to 65.

20. A process according to claim 18 wherein said emulsion comprises a disperse phase oil and a denser dispersed phase oil, and wherein the ratio of the Group 4 metal/Mg mol ratio in the disperse phase oil to the Group 4 metal/Mg mol ratio in the dispersed phase oil is at least 10.

21. A process according to claim 1 or claim 2 wherein said Group 2 metal is magnesium and said emulsion is composed of a dispersed phase oil which is a toluene/TiCl$_4$-insoluble oil having a Group 4 metal/Mg mol ratio greater than 0.1 but less than 10, and a disperse phase oil which is an oil phase less dense than that of the dispersed phase oil and which has a Group 4 metal/Mg mol ratio of 10 to 100.

22. A process according to claim 1 or claim 2 wherein the emulsion is agitated in the presence of an emulsion stabilizer comprising a surfactant.

23. A process according to claim 22 wherein said surfactant comprises an acrylic polymer or a methacrylic polymer.

24. A process according to claim 1 or claim 2 wherein the solidification of said particles is effected by heating the emulsion.

25. A process according to claim 24 wherein the emulsion is heated to a temperature of 70° C. to 150° C. to solidify said droplets.

26. A process according to claim 25 wherein the emulsion is heated to a temperature of 90° to 110° C.

27. A process according to claim 1 or claim 2 wherein the turbulence minimizing agent is a polymer having linear aliphatic carbon backbone chains.

28. A process according to claim 27 wherein the turbulence minimizing agent is selected from the group consisting of polymers of α-olefin monomers with 6 to 20 carbon atoms or mixtures thereof.

29. A process according to claim 28 wherein the turbulence minimizing agent is selected from the group consisting of polymers of octene, nonene, decene, undecene, dodecene, copolymers and mixtures of polymers thereof.

30. A process according to claim 1 or claim 2 wherein the turbulence minimizing agent is added to the emulsion in an amount of 1 to 1,000 ppm, based on the total weight of the reaction mixture.

31. A process according to claim 1 or claim 2 wherein the speed and means for agitating the emulsion and/or the amount and kind of said turbulence minimizing agent are adjusted in order to obtain catalyst component particles having an average size range of 5 to 200 μm.

32. A process according to claim 31 wherein said particles have an average size range of 10-100 μm.

33. An olefin polymerization catalyst comprising particles of the catalyst component prepared according to the process of claim 1 or claim 2 and a cocatalyst.

34. A process for the polymerization of olefins wherein the olefin polymerization catalyst of claim 33 is contacted with said olefins.

35. The process according to claim 1, wherein the emulsion is agitated in the presence of an emulsion stabilizer.

36. A process according to claim 12 wherein said compound of the transition metal is a halide.

37. A process according to claim 13 wherein said compound of the transition metal is a halide.

38. A process according to claim 27 wherein the turbulence minimizing agent is a polymer selected from the group consisting of α-olefin polymers, or mixtures thereof, wherein said α-olefin polymers have a molecular weight of about $1-40\times10^6$.

39. A process according to claim 30 wherein the turbulence minimizing agent is added to the emulsion in an amount of 5 to 100 ppm, based on the total weight of the reaction mixture.

40. A process according to claim 30 wherein the turbulence minimizing agent is added to the emulsion in an amount of 5 to 50 ppm, based on the total weight of the reaction mixture.

41. A process according to claim 31 wherein said particles have an average size range of 20 to 50 μm.

42. The olefin polymerization catalyst of claim 33 wherein the cocatalyst is an alkylaluminum cocatalyst.

43. The olefin polymerization catalyst of claim 33 further comprising an external electron donor.

44. The process of claim 34 wherein the olefins are $C_2$ to $C_{10}$ α-olefins.

45. The process of claim 34, wherein the olefins are selected from the group consisting of propylene, ethylene, and copolymers thereof with other α-olefins.

* * * * *